(No Model.)

J. FOX.
HAND RAKE.

No. 244,991. Patented Aug. 2, 1881.

WITNESSES
Wilmer Bradford
S. Phillips

INVENTOR.
Julius Fox
By C. W. M. Smith
Attorney.

UNITED STATES PATENT OFFICE.

JULIUS FOX, OF ALAMEDA, CALIFORNIA.

HAND-RAKE.

SPECIFICATION forming part of Letters Patent No. 244,991, dated August 2, 1881.

Application filed April 29, 1881. (No model.)

*To all whom it may concern:*

Be it known that I, JULIUS FOX, a citizen of the United States, and residing at Alameda, in the county of Alameda and State of California, have invented a new and useful Hand-Rake, of which the following is a specification.

The objects of my invention are to provide a rake of great strength and durability, and one in which the teeth will not be liable to hitch or catch in the ground over which it is being drawn. I attain these objects by the mechanism illustrated in the accompanying drawings, and in which—

Figure 1:
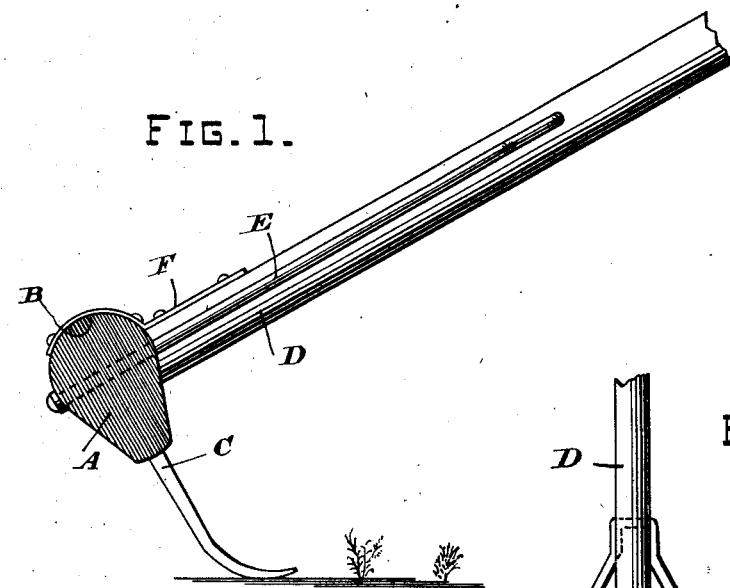
Figure 2:
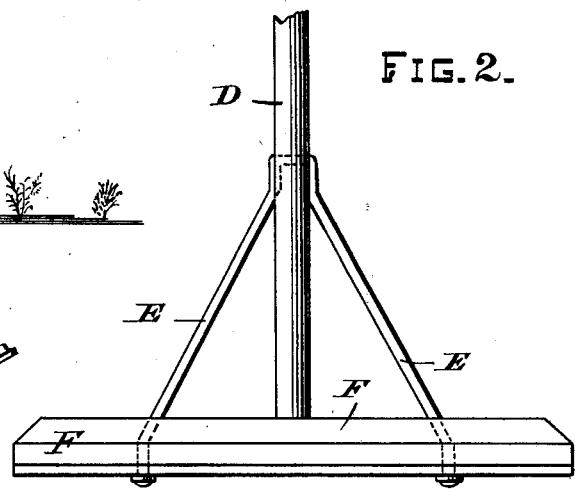
Figure 3:
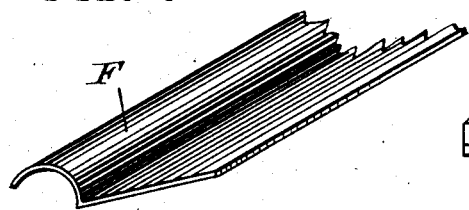
Figure 4:
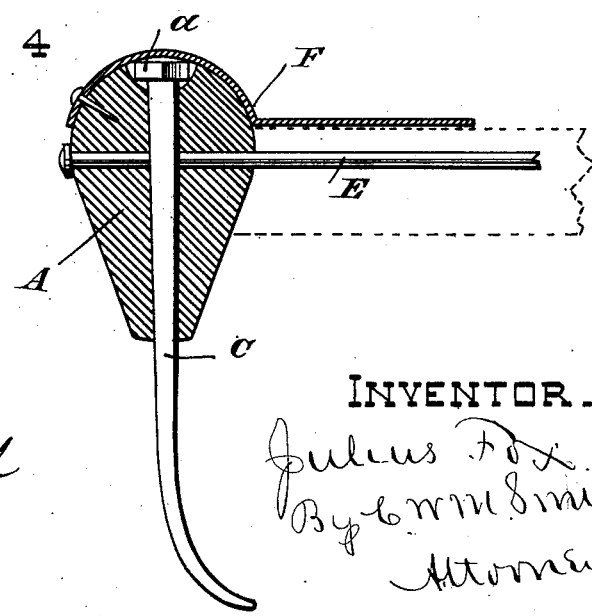

Figure 1 is a side view. Fig. 2 is a plan or top view; Fig. 3, a perspective view, partly broken away, of the cover or apron; Fig. 4, a cross-sectional view.

I construct the head A of my rake of wood, oval or egg shape in form, as shown in cross-section at Fig. 4. A half-round groove, B, is made along the entire head of the rake, upon the top thereof, in which vertical holes are bored to receive the teeth.

The teeth C of my rake I make of iron. They are curved, as shown, and provided with heads *a*, which are countersunk below the upper face of the rake-head. These teeth may be made of twenty-penny cut nails, which should be annealed before using.

In adjusting the teeth to the rake-head a suitable curve should be made by bending the points, as shown, so that the rake may be drawn smoothly over the ground and not engage with it. This curvature also assists in unloading the rake, which is performed by a backward movement, without the necessity of lifting the rake up to discharge its accumulated contents.

The hole for the end of the handle D is provided, and the handle is inserted in the usual manner.

I construct the strengthening arms or bow E of round wire, which is passed through the rake-handle and bent at right angles by pressure from the jaws of a vise, while the ends of the arms are inserted through the head of the rake and headed down upon washers, as shown in plan in Fig. 2.

The apron F is made of sheet-iron curved so as to fit the back of the head. This apron or cover protects the back of the rake from the weather, and prevents the withdrawal of the teeth of the rake, and also provides a receptacle against which the matter to be gathered accumulates, and when a sufficient quantity has been gathered the rake is pushed backward and the load deposited upon the ground in a heap without lifting the rake.

By this construction a simple, cheap, and durable rake is had, and one that is well adapted to lawns and all of the uses to which an ordinary hand-rake can be applied.

Having thus described my invention, what I claim, and desire to secure by Letters Patent, is—

1. In a hand-rake, the combination, with a grooved head having an oval form in cross-section, and provided with a suitably-braced handle and curved teeth, of a flanged apron covering the upper surface of the head and attaching end of the handle and extending across the rake, whereby it is adapted to accumulate and retain débris, substantially as specified.

2. The combination of the rake-head A, having groove B and curved teeth C, handle D, braces E E, and apron F, substantially as and for the purpose shown and described.

In testimony that I claim the foregoing I have hereunto set my hand and seal this 25th day of March, 1881.

JULIUS FOX. [L. S.]

Witnesses:
C. W. M. SMITH,
CHAS. E. KELLY.